United States Patent
Kuno et al.

(10) Patent No.: US 9,873,356 B2
(45) Date of Patent: Jan. 23, 2018

(54) SEAT BACK INTERLOCKING OTTOMAN DEVICE AND VEHICLE SEAT

(71) Applicant: TOYOTA BOSHOKU KABUSHIKI KAISHA, Aichi-ken (JP)

(72) Inventors: Satoru Kuno, Aichi-ken (JP); Hidetaka Nagayasu, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 246 days.

(21) Appl. No.: 14/305,261

(22) Filed: Jun. 16, 2014

(65) Prior Publication Data

US 2014/0375087 A1    Dec. 25, 2014

(30) Foreign Application Priority Data

Jun. 21, 2013   (JP) .................................. 2013-130434

(51) Int. Cl.
*B60N 2/22*       (2006.01)
*B60N 2/44*       (2006.01)
(Continued)

(52) U.S. Cl.
CPC .............. *B60N 2/22* (2013.01); *A47C 1/0355* (2013.01); *B60N 2/4495* (2013.01);
(Continued)

(58) Field of Classification Search
CPC ... B60N 2/4495; A47C 1/0355; A47C 1/0342; A47C 1/0345; A47C 1/035; B64D 11/064; B64D 11/0643; B61D 33/0021
(Continued)

(56) References Cited

U.S. PATENT DOCUMENTS 5,570,927 A * 11/1996 LaPointe ............... A47C 1/0355
                                                297/318
5,971,475 A * 10/1999 Lawson ............... A47C 1/0355
                                                297/68
(Continued)

FOREIGN PATENT DOCUMENTS

JP          2-139540          11/1990
JP          3-45748           4/1991
(Continued)

OTHER PUBLICATIONS

Office Action from Japanese Patent Office in Japanese Application No. 2013-130434, dated Aug. 16, 2016, along with an English language translation.

*Primary Examiner* — David R Dunn
*Assistant Examiner* — Tania Abraham
(74) *Attorney, Agent, or Firm* — Greenblum & Bernstein, P.L.C.

(57) ABSTRACT

There is provided a seat back interlocking ottoman device for a vehicle seat configured such that an angle of a seat back relative to a seat cushion can be adjusted and an ottoman is provided to the seat cushion. The ottoman device includes an interlocking mechanism configured to retract the ottoman to a retracted position below the front side of the seat cushion when the seat back is located at a regular usage position and to move the ottoman from the retracted position to an extended position at the front side of the seat cushion to thus support a leg part of a passenger when the seat back is tilted rearwards from the regular usage position. A part of the interlocking mechanism is configured to be operable by an arbitrary operation such that the ottoman can be moved between the retracted position and the extended position.

4 Claims, 6 Drawing Sheets

(51) Int. Cl.
- *A47C 1/034* (2006.01)
- *B64D 11/06* (2006.01)
- *A47C 1/0355* (2013.01)
- *B61D 33/00* (2006.01)

(52) U.S. Cl.
CPC ........ *B61D 33/0021* (2013.01); *B64D 11/064* (2014.12); *B64D 11/0639* (2014.12); *B64D 11/0643* (2014.12)

(58) Field of Classification Search
USPC .......................................................... 297/69
See application file for complete search history.

(56) References Cited

U.S. PATENT DOCUMENTS

| | | | |
|---|---|---|---|
| 5,992,931 A * | 11/1999 | LaPointe | A47C 1/0345 297/330 |
| 2013/0313867 A1 | 11/2013 | Kuno | |
| 2014/0145476 A1 | 5/2014 | Nagayasu | |
| 2014/0225400 A1 | 8/2014 | Nagayasu | |

FOREIGN PATENT DOCUMENTS

| | | |
|---|---|---|
| JP | 8-24067 | 1/1996 |
| JP | 2001-46167 | 2/2001 |
| JP | 2010-162337 | 7/2010 |
| WO | 2010-070939 | 6/2010 |

\* cited by examiner

SEAT BACK INTERLOCKING OTTOMAN DEVICE AND VEHICLE SEAT

BACKGROUND OF THE INVENTION

1. Field of the Invention

The present invention relates to a vehicle seat of an automobile, a train, an airplane and the like, and more particularly, to a seat back interlocking ottoman device which moves an ottoman provided at a front side of a seat cushion of a vehicle seat between an extended position and a retracted position while interlocking with change of an angle of a seat back relative to the seat cushion.

2. Description of the Related Art

There has been developed an ottoman interlocking seat in which when a seat back is tilted rearwards, a seat cushion is pushed forwards and an ottoman is extended towards the front of the seat cushion such that a passenger sitting on a seat can take a comfortable posture (refer to JP-U-H03-45748).

In this ottoman interlocking seat, the ottoman can not be extended independently from the rearward tilting of the seat back.

SUMMARY OF THE INVENTION

The present invention has been made in view of the above circumstances, and an object of the present invention is to arbitrarily operate a mechanism, which extends forwards an ottoman while interlocking with rearward tilting of a seat back, thereby arbitrarily extending the ottoman independently from a change in an angle of the seat back of an ottoman interlocking seat.

According to an illustrative embodiment of the present invention, there is provided a seat back interlocking ottoman device for a vehicle seat configured such that an angle of a seat back relative to a seat cushion can be adjusted and an ottoman is provided at a front side of the seat cushion, the seat back interlocking ottoman device comprising: an interlocking mechanism configured to interlock the seat back and the ottoman so as to retract the ottoman to a retracted position below the front side of the seat cushion when the seat back is located at a regular usage position suitable for sitting and to move the ottoman from the retracted position to an extended position at the front side of the seat cushion to thus support a leg part of a passenger from below when the seat back is tilted rearwards from the regular usage position, wherein a part of the interlocking mechanism is configured to be operable by an arbitrary operation such that the ottoman can be moved between the retracted position and the extended position.

According to this configuration, when the part of the interlocking mechanism configured to operable by an arbitrary operation is operated, it is possible to arbitrarily move the ottoman between the retracted position and the extended position, independently from a change in an angle of the seat back.

The above seat back interlocking ottoman device may further comprise a support member configured to support a part of the interlocking mechanism at a predetermined position when the ottoman is moved while interlocking with the seat back, wherein a position of the support member may be configured to be moved by an operating force larger than a force applied at the interlocking operation, and wherein the ottoman can be moved between the retracted position and the extended position by a movement of the support member.

According to this configuration, when the support member, which is located at a fixed (predetermined) position at the interlocking operation, is applied with the force larger than the force applied at the interlocking operation, it is possible to arbitrarily move the ottoman between the retracted position and the extended position, independently from a change in an angle of the seat back.

The above seat back interlocking ottoman device may further comprise an operating lever which is connected to the support member to move the support member, thereby moving the ottoman between the retracted position and the extended position independently from the interlocking operation between the seat back and the ottoman.

According to another illustrative embodiment of the present invention, there is provided a vehicle seat comprising: a seat cushion; a seat back configured such that an angle relative to the seat cushion can be adjusted; an ottoman provided at a front side of the seat cushion to be rotatable; and an interlocking mechanism configured to interlock the seat back and the ottoman so as to retract the ottoman to a retracted position below the front side of the seat cushion when the seat back is located at a regular usage position suitable for sitting and to move the ottoman from the retracted position to an extended position at the front side of the seat cushion to thus support a leg part of a passenger from below when the seat back is tilted rearwards from the regular usage position, wherein a part of the interlocking mechanism is configured to be movable independently from a movement of the seat back such that the ottoman can be moved between the retracted position and the extended position independently from the interlocking between the seat back and the ottoman.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Figure 1:
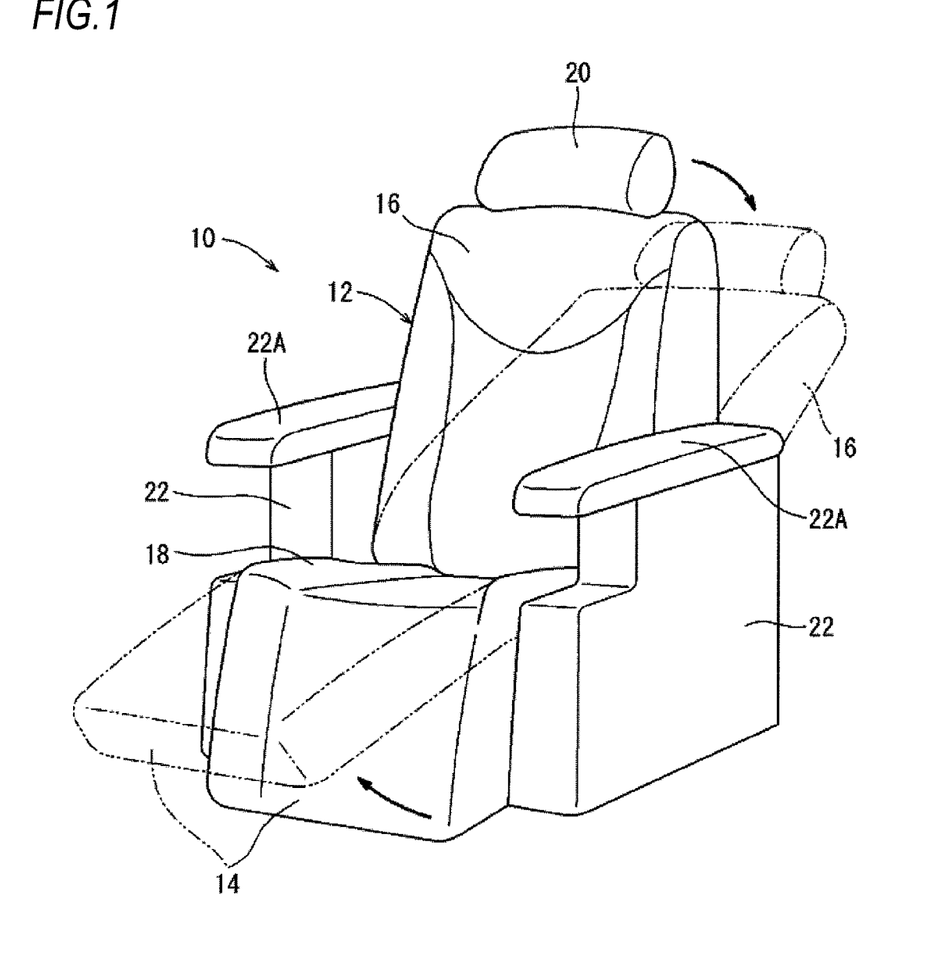
FIG. 1 is a perspective view showing an outer appearance of a vehicle seat according to an illustrative embodiment of the present invention.

FIGS. 1 to 5 show a vehicle seat 10 according to an illustrative embodiment. As shown in FIG. 1, the vehicle seat 10 has a configuration of a so-called captain seat for one passenger arranged at a second raw of a vehicle having three-raw seats. The vehicle seat 10 includes a seat back 16 which functions as a back support of a sitting passenger, and a seat cushion 18 which functions as a sitting part. A front part of the seat cushion 18 is provided with an ottoman 14 on which the passenger can put a leg.

Incidentally, in this description, a direction which a passenger sitting on the seat cushion 18 with leaning the back on the seat back 16 faces is referred to as a front, an opposite direction thereto is referred to as a rear, and a left-right direction of the passenger is referred to as a left-right direction and an upper-lower direction of the passenger is referred to as an upper-lower direction, unless particularly mentioned otherwise.

In FIG. 1, a positional state change is shown with a solid line and a broken line. The positional state shown with the solid line indicates a regular usage positional state at a regular sitting state, and the positional state shown with the broken line indicates a comfortable posture positional state.

When the seat back 16 is located at an upright regular usage positional state where the seat back 16 is used as the back support as shown with the solid line, the ottoman 14 is located at a retracted position where the ottoman 14 is folded to a front-lower part of the seat cushion 18. As shown with the broken line, when the seat back 16 is laid down from the regular usage position to a rearward tilted position to take a comfortable posture, the ottoman 14 is moved to an extended position, at which the ottoman 14 is raised upwardly such that a passenger can put a leg thereon, while interlocking with the operation of the seat back 16. In this illustrative embodiment, it is possible to arbitrarily change (adjust) an extension angle of the ottoman 14 at the extended position shown with the broken line. From any extended position of the ottoman 14 whose angle has been adjusted, the ottoman 14 can be returned to the retracted position while interlocking with an operation of raising the seat back 16 from the rearward tilted position to the regular upright position.

As described above, according to the vehicle seat 10 of this illustrative embodiment, it is possible to improve the usability of the ottoman 14, i.e., to retract and extend the ottoman 14 while interlocking with the operation of the seat back 16, to arbitrarily adjust the extended position of the ottoman 14 which is extended while interlocking with the operation of the seat back, and to return the ottoman 14 located at the adjusted positional state to the retracted position while interlocking with the operation of the seat back 16.

Hereinafter, the configurations of the respective parts of the vehicle seat 10 are described in detail.

As shown in FIG. 1, the vehicle seat 10 includes a seat main body 12 which has the seat back 16 and the seat cushion 18, and the ottoman 14 which is arranged at the front-lower part of the seat cushion 18. The ottoman 14 is rotatably supported to the seat cushion 18 such that the ottoman 14 can take the retracted position shown with the solid line and the extended position shown with the broken line. A headrest 20 which supports a head part of a sitting passenger is arranged at an upper part of the seat back 16 such that the headrest 20 can be moved in the upper-lower direction.

At both left and right sides of the seat main body 12, side walls 22 are provided to extend in a wall shape standing up from a floor of a vehicle. The seat main body 12 is connected and supported to base frames 24A of cushion frames 24 (described later) provided in the side walls 22. Incidentally, the vehicle seat 10 is mounted to the floor through slide rails (not shown) and is configured to be slidable in the front-rear direction. As the slide rails, a slide rail disclosed in JP-A-2010-221935 can be employed, for example. In the meantime, each side wall 22 has an upper surface part which is configured as an arm rest 22A on which a sitting passenger can put an arm.

The seat back 16 is tilted rearwards relative to the seat cushion 18 from the solid line position to the broken line position by a recliner (not shown) provided at a connection part of the seat cushion 18 and the seat back 16. As a basic structure of the recliner, the structure disclosed in JP-A-2011-116303 may be employed, for example, and the detailed descriptions thereof are omitted.

The recliner includes a lock structure. The lock structure is released by a pull-up operation of a reclining lever (not shown) provided at a side such as the side wall 22. The reclining lever is always applied with a spring force in a direction of locking the recliner. Therefore, when the pull-up operation of the reclining lever is released, the reclining lever holds the recliner at a positional state where the seat back 16 is set at the locked state.

Figure 2:
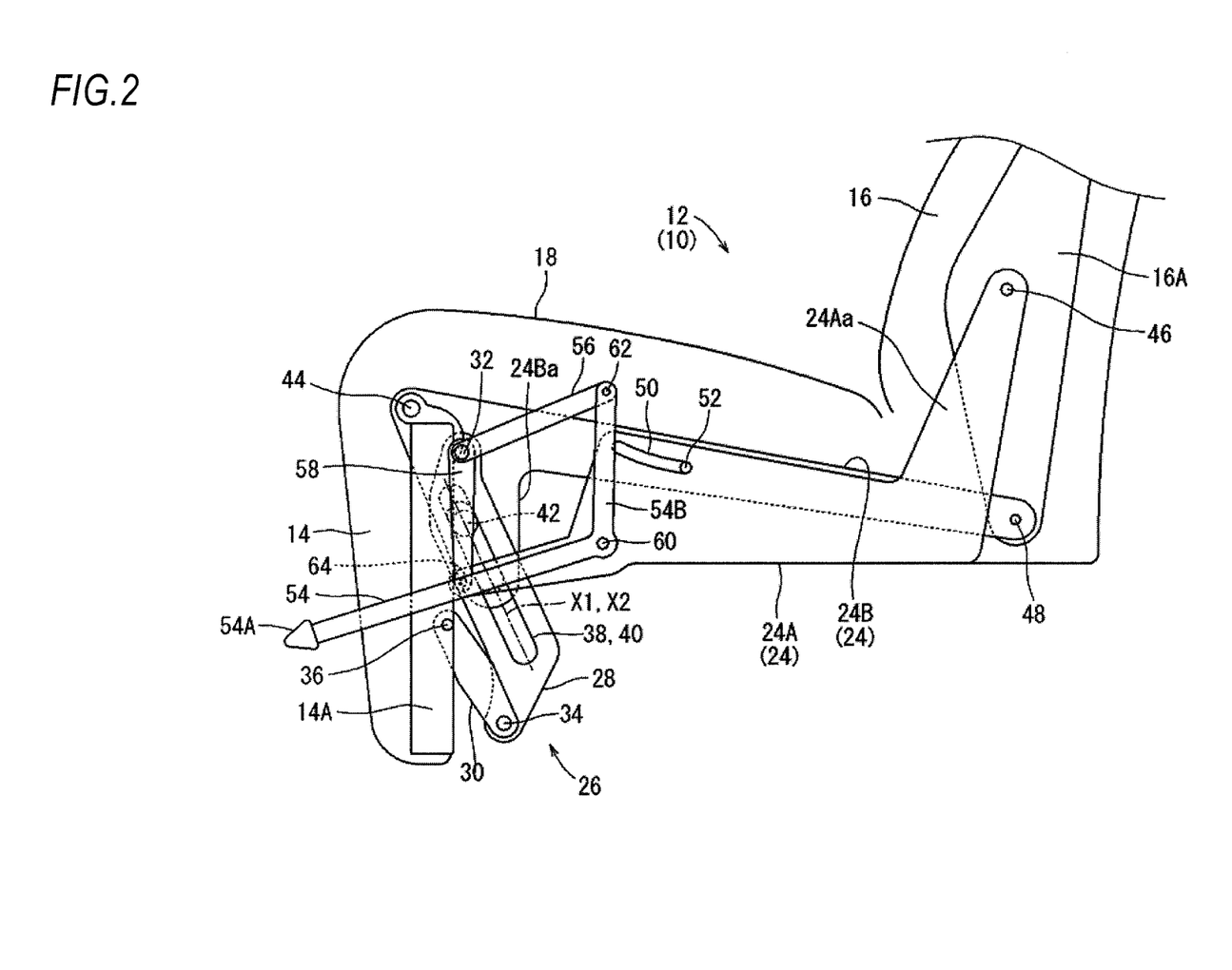
FIG. 2 is a schematic side view of an interlocking mechanism of a seat back and an ottoman in the illustrative embodiment when the ottoman is located at a retracted position.
Figure 3:
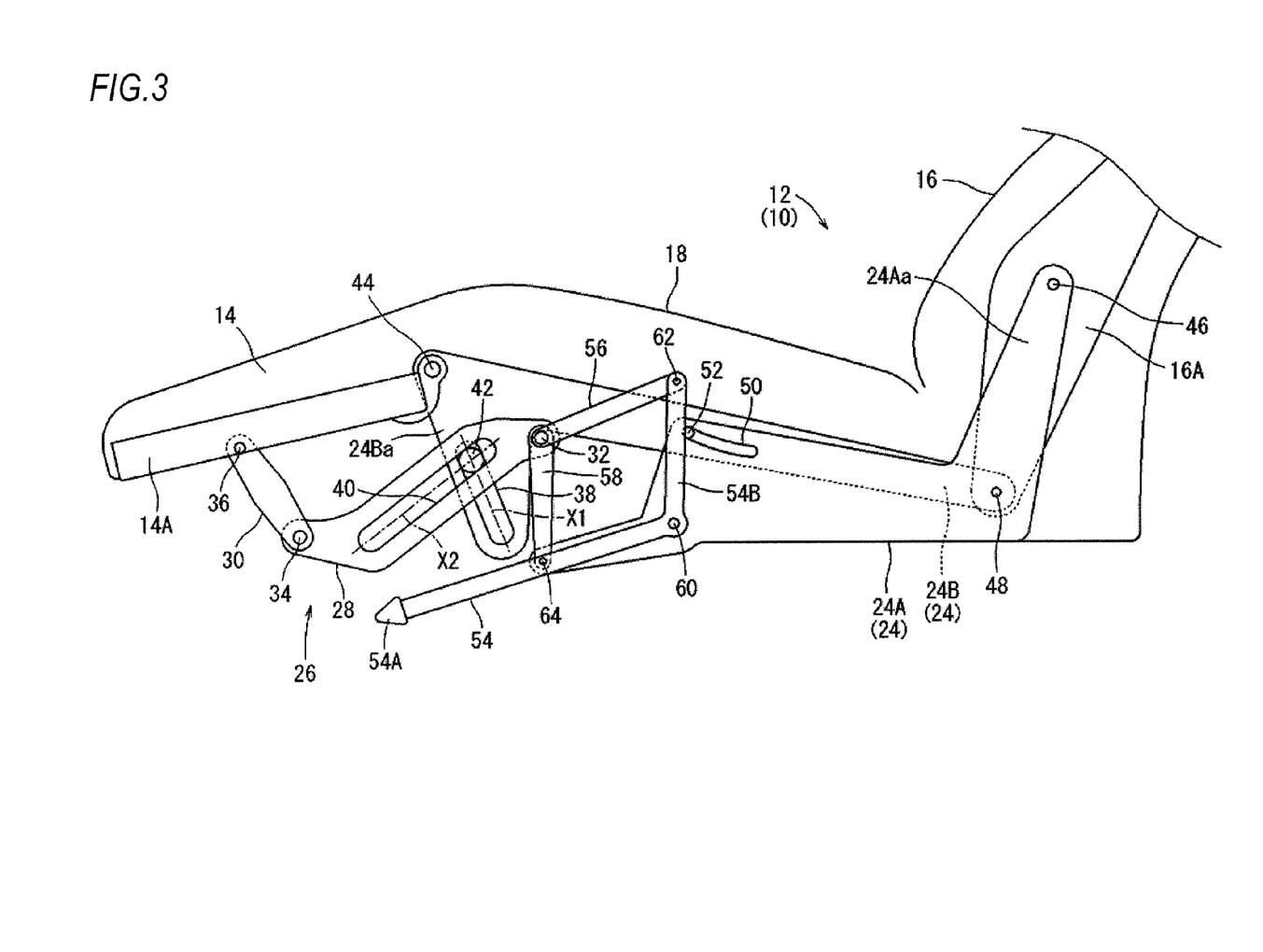
FIG. 3 is a schematic side view of the interlocking mechanism when the ottoman is located at an extended position.
Figure 4:
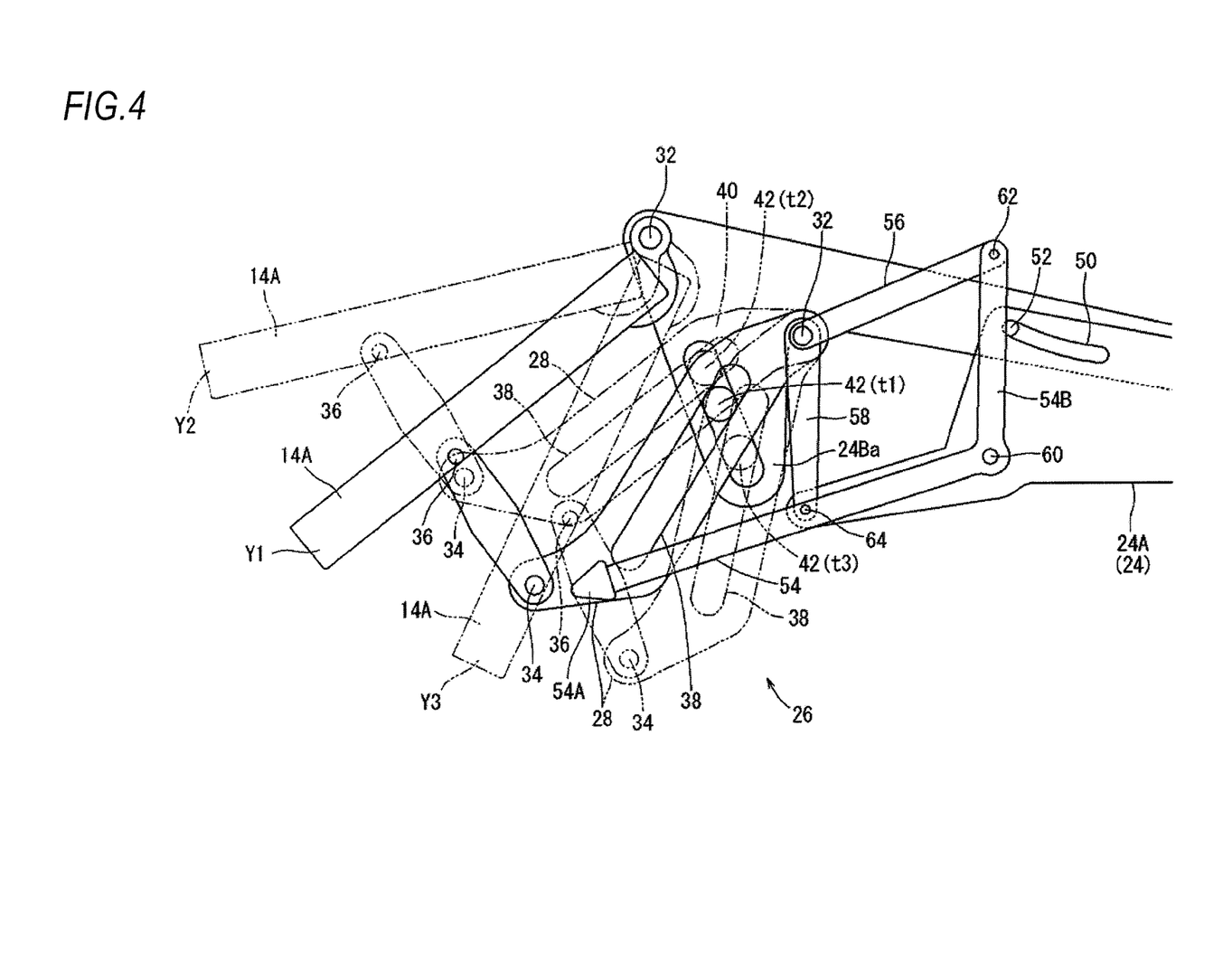
FIG. 4 shows a front end portion in the schematic view of FIG. 3 and shows an operation change when the extended position of the ottoman is adjusted by a link connection structure.
Figure 5:
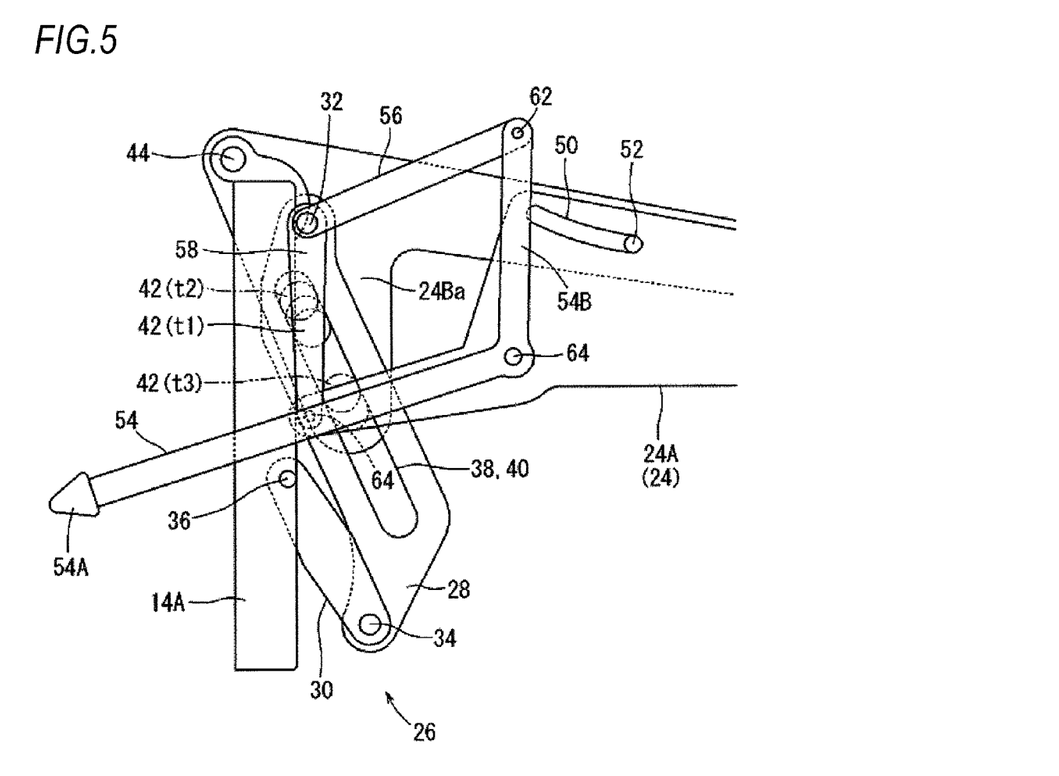
FIG. 5 shows the front end portion in the schematic view of FIG. 2 and shows an operating state when the ottoman is located at the retracted position.

Subsequently, the interlocking operational configuration of the seat back 16 and the ottoman 14 is described with reference to FIGS. 2 to 5. FIGS. 2 to 5 schematically show the vehicle seat 10 seen from the side. FIGS. 2 and 5 show an interlocking positional relation where the ottoman 14 is located at the retracted position when the seat back 16 is at the regular upright positional state. FIG. 3 shows an interlocking positional relation where the ottoman 14 is located at the extended position when the seat back 16 is tilted rearwards and is thus located at the comfortable posture positional state. FIG. 4 shows an operating state when only the extended position of the ottoman 14 is adjusted at the predetermined interlocking positional state of FIG. 3.

Referring to FIG. 2, the cushion frame 24 provided for the seat cushion 18 includes the base frame 24A and a slide frame 24B. The base frame 24A and the slide frame 24B are provided in a sitting direction and are arranged side by side. The slide frame 24B is provided to be moveable relative to the base frame 24A in the front-rear direction, in FIG. 2. To this end, the base frame 24A is formed with a guide hole 50 which is long in the front-rear direction, the slide frame 24B is integrally provided with a slide pin 52, and the slide pin 52 is slid with being engaged with the guide hole 50, so that the slide pin guides the slide frame 24B while regulating the movement of the slide frame 24B along the front-rear direction.

A rear end portion (a right end portion in FIG. 2) of the slide frame 24B is rotatably coupled to a lower end portion of a side frame 16A of the seat back 16 by a pin coupling 48. The side frame 16A of the seat back 16 is pivotally supported and coupled to a projection part 24Aa, which is a part formed as a rear part of the base frame 24A and protrudes upwardly, by a shaft coupling 46. The seat back 16 is tilted forwards and rearwards about the shaft coupling 46. Therefore, when an upper part of the seat back 16 is tilted rearwards from the shaft coupling 46 to the comfortable posture state, this movement is transmitted to the slide frame 24B by the pin coupling 48, as a forward sliding movement. On the other hand, when the seat back 16 is tilted forwards from the rearward tilted position of the comfortable posture state, that movement is transmitted to the slide frame 24B, as a rearward sliding movement. Meanwhile, although not shown, the recliner is mounted at the shaft 46 at which the side frame 16A of the seat back 16 is rotatably shaft-supported to the projection part 24Aa of the base frame 24A.

A front end portion (a left end portion in FIG. 2) of the slide frame 24B is pivotally supported and coupled to one end of a support frame member 14A of the ottoman 14 by a shaft coupling 44, and the ottoman 14 is provided at the front-lower position of the seat cushion 18 to be rotatable about the shaft coupling 44. Therefore, the ottoman 14 is also slid forwards and rearwards as the slide frame 24B is moved forwards and rearwards. In the meantime, the positional state where the ottoman 14 extends downwardly in FIG. 2 is the retracted position at which the ottoman 14 is retracted to the front-lower part of the seat cushion 18. The extended state is shown in FIG. 3, in which the other end portion of the ottoman 14 is rotated upwardly.

The base frame 24A is slidably mounted on the floor through the slide rails (not shown). Therefore, in this illustrative embodiment, the entire vehicle seat is mounted on the floor so that the vehicle seat can be moved forwards and rearwards. In the meantime, a cushion pad configuring a sitting part of the seat cushion 18 is put on the slide frame 24B. Thus, a sitting surface, which is the upper surface of the seat cushion 18, is integrated with the slide frame 24B and is moved forwards and rearwards as the slide frame 24B is moved. Therefore, as the seat back 16 is tilted rearwards, the slide frame 24B is moved forwards and the sitting surface of the seat cushion 18 is also moved forwards.

A front end portion (a left end portion in FIG. 2) of the base frame 24A and the ottoman 14 are connected by a first link member 26. The first link member 26 includes two thin plate-shaped link members 28, 30 connected by a pin coupling 34. One end of the link member 28 is relatively rotatably connected by a pin coupling 32 (an example of a support member) connecting a first connection link 56 and a second connection link 58, which will be described later. As described later, the second connection link 58 is pivotally supported and coupled to the base frame 24A by a shaft coupling 64. Accordingly, the one end of the link member 28 is connected to the base frame 24A through the second connection link 58. Also, the other end of the link member 28 is relatively rotatably connected by the pin coupling 34, like one end of the link member 30. The other end of the link member 30 is relatively rotatably connected to a substantially central position of the support frame member 14A of the ottoman 14 by a pin coupling 36 in FIG. 2.

The front end portion of the slide frame 24B is formed with a slide part 24Ba, which integrally extends downwards in FIG. 2, and the link member 28 of the first link member 26 is overlapped over the slide part 24Ba with being surface-matched. The slide part 24Ba and the link member A28 overlapping with each other are respectively formed with linear guide holes 38, 40 having a long hole shape. The guide holes 38, 40 are arranged such that when the ottoman 14 is located at the retracted position shown in FIG. 2, axis lines X1, X2 of the guide holes 38, 40 coincide with each other. Here, the axis line of the guide hole 40 formed at the slide part 24Ba is denoted with X1 and the axis line of the guide hole 38 formed at the link member A28 is denoted with X2.

A common connecting pin member 42 is engaged in the respective guide holes 38, 40. The connecting pin member 42 is configured to slidably move in the respective guide holes 38, 40. When a relative positional relation of the connecting pin member 42 with respect to the guide holes 38, 40 is changed, the extension angle of the ottoman 14 can be changed. In the meantime, a lock mechanism (not shown) for fixing an engaged positional state of the connecting pin member 42 with the guide hole 40 is provided between the connecting pin member 42 and the slide part 24Ba.

The interlocking operation of the seat back 16 and the ottoman 14 is described with reference to FIGS. 2 to 5.

FIG. 2 shows a state where the vehicle seat 10 shown in FIG. 1 is located at the regular usage positional state shown with the solid line, which is the regular sitting posture. In FIG. 2, the seat back 16 takes an upright position and the ottoman 14 is located at the retracted position at which the ottoman 14 is retracted at the front-lower part of the seat cushion 18. At this state, the side frame 16A of the seat back 16 takes the upright position with being pivotally supported and coupled to the projection part 24Aa of the base frame 24A by the shaft coupling 46, and the slide frame 24B coupled to the lower end of the side frame 16A by the pin coupling 48 is located at the relatively rearward position with respect to the base frame 24A. At the positional state of the base frame 24A and the slide frame 24B, the slide pin 52 provided for the slide frame 24B is engaged with the guide hole 50 provided for the base frame 24A at a rear part of the guide hole 50 in FIG. 2.

The operation positional state of the slide frame 24B is transmitted to the ottoman 14 which is pivotally supported and coupled to the front end of the slide frame 24B by the shaft coupling 44. The position of the ottoman 14 is controlled by the first link member 26 interposed between the ottoman 14 and the front end portion of the base frame 24A. The link member 28 of the first link member 26 is rotatably coupled to the front end portion of the base frame 24A through the second connection link 58 by the pin coupling 32. The link member is rotated while interlocking with the forward and rearward movement of the slide part 24Ba since the connecting pin member 42 fixed to the slide part 24Ba of the slide frame 24B by the lock mechanism (not shown) is engaged in the guide hole 38 of the link member 28 such that the connecting pin member 42 can be slid in the axis line X2 direction. At the state shown in FIG. 2, since the slide part 24Ba, i.e., the slide frame 24B is located at the most rearward position, a lower end of the other end of the link member 28 is also located at the most rearward position. That positional state is transmitted to the support frame member 14A of the ottoman 14, which is coupled by the pin coupling 36 through the link member 30 coupled by the pin coupling 34, so that the ottoman 14 is located at the retracted position.

Then, a moving operation from the upright positional state of the seat back 16 shown with the solid line in FIG. 1 to the comfortable posture state shown with the broken line where the seat back 16 is tilted rearwards and the ottoman 14 is extended (rotated) upwards is performed as follows. FIG. 3 shows an operating state of the comfortable posture state. As the seat back 16 is tilted rearwards, the side frame 16A of the seat back 16 is rotated in a clockwise direction about the shaft coupling 46 serving as a rotating shaft and slides forwards the slide frame 24B coupled to the lower end of the side frame by the pin coupling 48. That is, the slide frame 24B relatively slides forwards with respect to the base frame 24A. At the positional state of the base frame 24A and the slide frame 24B, the slide pin 52 provided for the slide frame 24B is engaged with the guide hole 50 provided for the base frame 24A at a front end of the guide hole 50 in FIG. 2.

As the slide frame 24B is moved forwards shown in FIG. 3, the integrated slide part 24Ba is also moved forwards. While interlocking with this movement, the connecting pin member 42 fixed to the slide part 24Ba rotates the link member 28 in the clockwise direction about the part which is coupled to the front end of the base frame 24A through the second connection link 58 by the pin coupling 32 and serves as a rotating shaft, thereby moving forwards the lower end of the other end of the link member 28 in FIG. 3. At this time, as described later, the position of the second connection link 58 is fixed, so that the position of the pin coupling 32 is also fixed. The movement of the lower end of the link member 28 is transmitted to the support frame member 14A of the ottoman 14 through the link member 30 coupled by the pin couplings 34, 36, so that the ottoman 14 is rotated in the clockwise direction about the part, which is pivotally supported and coupled to the slide frame 24B by the shaft coupling 44 and serves as a rotating shaft, and is thus extended (rotated) upwards. At this time, since the part of the ottoman 14 pivotally supported and coupled by the shaft coupling 44 is also moved forwards, the ottoman 14 is extended (rotated) while the ottoman 14 itself is moved forwards. At the extending rotation of the ottoman 14, the link member 28 is rotated about the pin coupling 32 as the connecting pin member 42 is slid in the lower end direction of the link member 28 through the guide hole 38 of the link member 28 while interlocking with the forward movement of the connecting pin member 42. Accordingly, in this illustrative embodiment, the interlocking operation of the seat back 16 and the ottoman 14 is performed and the operation from the regular posture state shown in FIG. 2 to the comfortable posture state shown in FIG. 3 is performed. In the meantime, an operation from the comfortable posture state shown in FIG. 3 to the regular posture state shown in FIG. 2 is performed by an opposite operation to the above operation.

In this illustrative embodiment, at the comfortable posture state where the ottoman 14 is extended and rotated while interlocking with the rearward tilting of the seat back 16 (refer to FIG. 3), it is possible to arbitrarily adjust only the extension angle of the ottoman 14 without changing the posture state of the seat back 16, according to the preference of the sitting passenger. That is, while the ottoman 14 is caused to operate while interlocking with the seat back, a relative positional relation between the seat back 16 and the ottoman 14 can be adjusted independently from the interlocking operation. This operation is described with reference to FIG. 4.

An extension angle position of the ottoman 14 shown with the solid line in FIG. 4 is assumed as a position Y1 to which the ottoman 14 is extended and rotated while interlocking with the seat back 16. The position Y1 is rotated and changed to positions Y2, Y3 shown with the broken lines by releasing the fixing of the connecting pin member 42 to the slide part 24Ba by the lock mechanism (not shown) to thus slide the connecting pin member 42 along the guide hole 40 formed at the slide part 24Ba. When adjusting the ottoman 14 to the rotation position Y2, the connecting pin member 42 is released from the fixed state to the slide part 24Ba, is slid from a position t1 to a position t2 and is again fixed to the slide part 24Ba. Also, when adjusting the ottoman 14 to the rotation position Y3, the fixed position of the connecting pin member 42 to the slide part 24Ba is moved from the position t1 of the guide hole 40 to a position t3. At this time, the engaged positional state of the connecting pin member 42 to the guide hole 38 of the link member 28 is also slid and changed while interlocking with the change in the rotation position of the ottoman 14.

Accordingly, even when the position of the connecting pin member 42 relative to the slide part 24Ba is changed to thus change the extension angle of the ottoman 14 and the seat back 16 is returned to the regular posture state, at the state where the ottoman 14 is returned to the retracted position, the position of the ottoman 14 is not changed and is located at the retracted position, independently from the position of the connecting pin member 42. This situation is shown in FIG. 5. As described above, even when the position of the connecting pin member 42 is changed to the positions t1, t2, t3, the guide hole 40 of the slide part 24Ba in which the connecting pin member 42 is slid and the guide hole 38 of the link member 28 overlap with each other at the state where the ottoman 14 is located at the retracted position. Therefore, the position of the link member 28 remains unchanged, regardless of the position of the connecting pin member 42.

Figure 6:
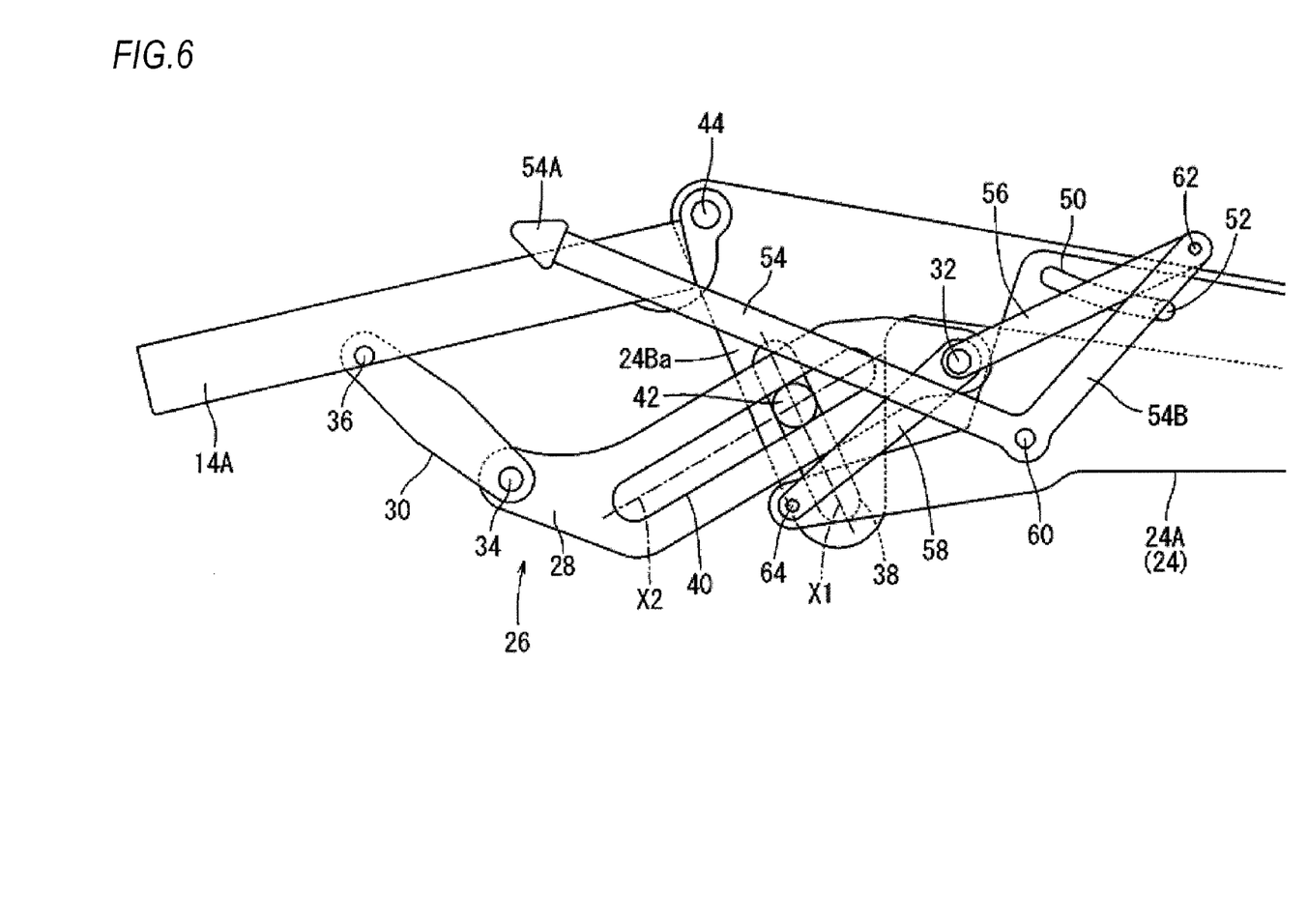
FIG. 6 shows the front end portion in the schematic view of FIG. 2 and shows an operating state when the ottoman is changed from the retracted position to the extended position by an operation of an operating lever.

Although not shown in FIG. 1, an operating lever 54 is provided between a left side of the ottoman 14 and the side wall 22. As shown in FIGS. 2 to 6, the operating lever 54 has an operating part 54A which protrudes more forwards than a front surface of the ottoman 14 located at the retracted position. The operating lever 54 is pivotally supported, coupled and fixed to a side of the base frame 24A by a shaft coupling 60. Also, the operating lever 54 is bent upwardly at the part pivotally supported and coupled by the shaft coupling 60. The bent extension part 54B of the operating lever 54 is coupled to one end of the first connection link 56 by a pin coupling 62, and the other end of the first connection link 56 is coupled to one end of the second connection link 58 by the pin coupling 32. As described above, the other end of the second connection link 58 is pivotally supported, coupled and fixed to the front end portion of the base frame 24A by the shaft coupling 64. Therefore, the extension part 54B of the operating lever 54, the first connection link 56 and the second connection link 58 configure a four-node link together with the front end portion of the base frame 24A. When the operating lever 54 is rotated from a lower-side position shown in FIGS. 2 to 5 to an upper-side position shown in FIG. 6, the extension part 54B of the operating lever 54, the first connection link 56 and the second connection link 58 are changed from the state shown in FIGS. 2 to 5 to the state shown in FIG. 6. This change causes a change in the position of the pin coupling 32 and a change in the position of the one end of the link member 28. At this time, as shown in FIG. 2, when the seat back 16 is located at the regular usage positional state and the ottoman 14 is located at the retracted position, the one end of the link member 28 is moved rearwards as shown in FIG. 6 and the other end of the link member 28 is pushed in the front-upper direction. As a result, the ottoman 14 is extended.

The part of the base frame 24A pivotally supported and coupled by the shaft coupling 60 is provided with a moderation mechanism (not shown) for enabling a user to have a feeling of moderation at operation of the operating lever 54. When the operating lever 54 is rotated from the lower-side positional state to the upper-side positional state and when the operating lever 54 is rotated from the upper-side positional state to the lower-side positional state, the operating lever 54 is set such that an operation cannot be made unless a force of a predetermined value or larger is applied at starting of the operation. The reason to provide the moderation mechanism is that a sharp operating feeling can be achieved by enabling a user to have a feeling of moderation at operation of the operating lever 54 and that the position of the pin coupling 32 is not moved when the position of the ottoman 14 is changed while interlocking with the seat back 16. When the position of the ottoman 14 is changed while interlocking with the seat back 16, the link member 28 is rotated about the pin coupling 32 serving as a support point through the connecting pin member 42 while interlocking with the forward and rearward movement of the slide part 24Ba relative to the slide frame 24B. Incidentally, at this time, if the pin coupling 32 is moved as the link member 28 is moved, it is not possible to implement the position change of the ottoman 14 while interlocking with the seat back 16. Accordingly, the predetermined value of the moderation mechanism is set such that the pin coupling 32 is not moved as the link member 28 is moved when the position of the ottoman 14 is changed while interlocking with the seat back 16. In the meantime, as the moderation mechanism, various known moderation mechanisms can be used. The moderation mechanism may be provided to the shaft coupling 64, rather than the shaft coupling 60.

The four-node link configured by the extension part 54B of the operating lever 54, the first connection link 56, the second connection link 58 and the front end portion of the base frame 24A is also provided at the right side part of the ottoman 14, symmetrically with the left side. However, since only one operating lever 54 is provided, the movement of the extension part 54B made at the operation of the operating lever 54 is transmitted to the opposite extension part 54B by a cable (not shown). Accordingly, the four-node links are provided for both sides of the ottoman 14 and are interlocked each other, so that a distortion between the left and right link members can be prevented. Incidentally, if the passenger is caused not to put a leg part on the ottoman 14 when the ottoman 14 is moved between the retracted position and the extended position, the distortion would not be generated. In this case, the four-node link may not be provided at the opposite side. This simplifies the configuration.

As described above, the pin coupling 32 provided at one end-side of the link member 28 which is a part of the interlocking mechanism can be arbitrarily operated by operating the operating lever 54, so that the ottoman 14 can be moved between the retracted position and the extended position. Therefore, when the operating lever 54 is operated between the lower-side position and the upper-side position, it is possible to arbitrarily move the ottoman 14 between the retracted position and the extended position, independently from the change in the angle of the seat back 16.

In the above illustrative embodiment, the side frame 16A, the slide frame 24B (including the slide part 24Ba), the first link member 26 and the connecting pin member 42 are an example of an interlocking mechanism.

While the present invention has been shown and described with reference to certain illustrative embodiments thereof, it will be understood by those skilled in the art that various changes in form and details may be made therein without departing from the spirit and scope of the invention as defined by the appended claims.

For example, a part of the interlocking mechanism may be configured to be separated. At a state where the part of the interlocking mechanism is not separated, the ottoman may be moved between the retracted position and the extended position while interlocking with the movement of the seat back by the original function of the interlocking mechanism. At a state where that part of the interlocking mechanism is separated, the ottoman may be moved between the retracted position and the extended position by an arbitrary operation using the operating lever, independently from the movement of the seat back.

What is claimed is:

1. A seat back interlocking ottoman device for a vehicle seat configured such that an angle of a seat back relative to a seat cushion can be adjusted and an ottoman is provided at a front side of the seat cushion, the seat back interlocking ottoman device comprising:
an interlocking mechanism configured to interlock the seat back and the ottoman so as to retract the ottoman to a retracted position below the front side of the seat cushion when the seat back is located at a regular usage position suitable for sitting and to move the ottoman from the retracted position to an extended position at the front side of the seat cushion to thus support a leg part of a passenger from below when the seat back is tilted rearwards from the regular usage position;
a support member configured to support a part of the interlocking mechanism at a predetermined position when the ottoman is moved while the ottoman is interlocked with the seat back, and
an operating lever which is connected to the support member to move the support member, thereby moving the ottoman between the retracted position and the extended position independently from the interlocking operation between the seat back and the ottoman;
wherein the part of the interlocking mechanism is configured to be operable by an operation independent of a movement of the seat back, such that the ottoman can be moved to a desired position between the retracted position and the extended position independent of the movement of the seat back,
wherein a position of the support member is configured to be moved by a force larger than a force applied at the interlocking mechanism, and
wherein the ottoman is configured to be moved between the retracted position and the extended position by a movement of the support member.

2. A vehicle seat comprising:
a seat cushion;
a seat back configured such that an angle relative to the seat cushion can be adjusted;
an ottoman provided at a front side of the seat cushion to be rotatable;
an interlocking mechanism configured to interlock the seat back and the ottoman so as to retract the ottoman to a retracted position below the front side of the seat cushion when the seat back is located at a regular usage position suitable for sitting and to move the ottoman from the retracted position to an extended position at the front side of the seat cushion to thus support a leg part of a passenger from below when the seat back is tilted rearwards from the regular usage position;
a support member configured to support a part of the interlocking mechanism at a predetermined position when the ottoman is moved while the ottoman is interlocked with the seat back, and
an operating lever which is connected to the support member to move the support member, thereby moving the ottoman between the retracted position and the extended position independently from the interlocking operation between the seat back and the ottoman;
wherein the part of the interlocking mechanism is configured to be movable independently from a movement of the seat back such that the ottoman can be moved between the retracted position and the extended position independently from the interlocking between the seat back and the ottoman,
wherein a position of the support member is configured to be moved by a force larger than a force applied at the interlocking mechanism, and
wherein the ottoman is configured to be moved between the retracted position and the extended position by a movement of the support member.

3. A seat back interlocking ottoman device for a vehicle seat configured such that an angle of a seat back relative to a seat cushion can be adjusted and an ottoman is provided at a front side of the seat cushion, the seat back interlocking ottoman device comprising:

an interlocking mechanism configured to interlock the seat back and the ottoman so as to retract the ottoman to a retracted position below the front side of the seat cushion when the seat back is located at a regular usage position suitable for sitting and to move the ottoman from the retracted position to an extended position at the front side of the seat cushion to thus support a leg part of a passenger from below when the seat back is tilted rearwards from the regular usage position; and an operating lever configured to operate the ottoman independent of the movement of the seat back, wherein a part of the interlocking mechanism is configured to be operable by an operation independent of a movement of the seat back, such that the ottoman can be moved to a desired position between the retracted position and the extended position independent of the movement of the seat back, wherein the operating lever overtakes control of the ottoman from the interlocking mechanism by applying a first force on the part of the interlocking mechanism, and wherein the first force is larger than a second force applied on the part of the interlocking mechanism by the seat back.

4. A vehicle seat comprising:
a seat cushion;
a seat back configured such that an angle relative to the seat cushion can be adjusted;
an ottoman provided at a front side of the seat cushion to be rotatable;
an interlocking mechanism configured to interlock the seat back and the ottoman so as to retract the ottoman to a retracted position below the front side of the seat cushion when the seat back is located at a regular usage position suitable for sitting and to move the ottoman from the retracted position to an extended position at the front side of the seat cushion to thus support a leg part of a passenger from below when the seat back is tilted rearwards from the regular usage position; and
an operating lever configured to operate the ottoman independent of the movement of the seat back,
wherein a part of the interlocking mechanism is configured to be movable independently from a movement of the seat back such that the ottoman can be moved between the retracted position and the extended position independently from the interlocking between the seat back and the ottoman,
wherein the operating lever overtakes control of the ottoman from the interlocking mechanism by applying a first force on the part of the interlocking mechanism, and
wherein the first force is larger than a second force applied on the part of the interlocking mechanism by the seat back.

\* \* \* \* \*